INVENTORS
SIXT FREDRICK KAPFF
WENDELL P. CROPPER

United States Patent Office 3,453,891
Patented July 8, 1969

3,453,891
APPARATUS FOR DETERMINING DENSITY OF A SAMPLE LIQUID
Sixt Frederick Kapff, Homewood, and Wendell P. Cropper, Olympia Fields, Ill., assignors to Standard Oil Company, Chicago, Ill., a corporation of Indiana
Filed June 27, 1966, Ser. No. 560,755
Int. Cl. G01n 9/28
U.S. Cl. 73—439          7 Claims

ABSTRACT OF THE DISCLOSURE

A density measuring apparatus is disclosed which automatically provides a temperature-compensated density signal. This apparatus includes a differential bubbler and a thermocouple which are both immersed in a sample liquid. The bubbler generates a first electrical signal corresponding to the density of the sample, and the thermocouple generates a second electrical signal corresponding to the temperature of the sample. The second signal is transmitted to a standard thermocouple reference power supply, which responds to this signal and generates a third electrical signal corresponding to the difference between the actual temperature of the sample and a predetermined reference temperature. Circuit means then mix the first and third signals to provide a temperature-compensated electrical signal which drives a meter.

---

This invention relates to an improved method and apparatus for determining the density or gravity of a sample liquid. More particularly, the method and apparatus of this invention provide a means for determining the temperature-compensated density or gravity of a sample liquid when the temperature of the liquid is other than the reference temperature of the desired units of density being determined.

Laboratory density or gravity determinations may be performed in a variety of ways. The utilization of a differential bubbler employing the reference-column method, or the range-suppression method, or the single-vessel method, are examples of common laboratory methods for density determinations of sample liquids. The differential bubbler employing the single-vessel method is one of the simplest and most widely used methods of density measurement. This method utilizes two bubbler tubes positioned in the sample fluid so that the end of one tube is lower than that of the other. The pressure required to bubble air into the fluid is equal to the pressure in the fluid at the ends of the bubbler tubes. Since the outlet of one is lower than that of the other, the difference in pressure will be the same as the weight of a constant-height column of the liquid. Therefore, the differential pressure measurement is equivalent to the weight of a constant volume of the liquid and can be represented directly as density. This method is accurate to within about 0.3 to 1% specific gravity when used with liquids which do not tend to crystallize in the measuring pipes. (For a discussion of this and the other methods mentioned, see Considine, Process Instruments and Controls Handbook, McGraw-Hill, 1957, pp. 7–58.)

When employing the single-vessel method as is the case with the other methods, it is necessary to compensate the density or gravity readings obtained for a sample temperature. For example, in petroleum laboratories density determinations are most often made in degrees API. The reference temperature for the API gravity scale is 60° F. Therefore, in making these determinations it is necessary to compensate for temperature when the sample temperature is other than 60° F.

Through the utilization of the method and apparatus in accordance with this invention, it is possible to perform temperature-compensated density determinations in any desired units of density or gravity quickly and accurately. In addition, the density or gravity of the sample liquid is easily read and temperature corrections are automatically made.

Briefly stated, this invention provides a method and apparatus for determining the gravity or density of a sample liquid which comprises generating an electrical differential pressure signal proportional to the density of the sample liquid by bubbling air through the sample at substantially constant rates from two different levels within the liquid, measuring the temperature of the sample liquid and generating an electrical compensation signal proportional to the difference between the sample temperature and a predetermined reference temperature, and imposing the compensation signal upon the differential pressure signal to provide a temperature-compensated output signal which provides a measure of the density of the sample at the reference temperature.

In one embodiment of this invention the apparatus comprises a first means in communication with the sample liquid adapted to generate and transmit an electrical differential pressure signal proportional to the density of the sample liquid, a second means in communication with the sample liquid adapted to measure and transmit an electrical compensation signal proportional to the difference between the sample temperature and the reference temperature, and a third means in electrical communication with the first means and the second means adapted to receive the differential pressure signal and the compensation signal and impose the compensation signal upon the differential pressure signal to provide and transmit a temperature compensated output signal which provides a measure of the density of the sample at the reference temperature. Preferably, the apparatus in accordance with this invention would utilize a differential bubbler provided with a differential pressure transmitter to generate and transmit the electrical differential pressure signal proportional to the density of the liquid. The temperature of the sample liquid should be measured at a point within the liquid which most closely represents the average temperature of the liquid. A thermocouple such as a copper-constantan thermocouple junction located at a point about midway between the ends of the air tubes is the preferred means to measure and transmit the electrical temperature compensation signal which is proportional to the difference between the sample temperature and the reference temperature. In the preferred embodiment of third apparatus amplifying means may be utilized to amplify the temperature compensated signal to a level sufficient to drive a recorder whereby the gravity or density may be directly read. While the term air is used in describing the gas bubbled through the liquid, it is to be understood that any inert gas, that is, one which is non-soluble and non-reacting with the particular sample liquid, may be used. The full nature of the invention will be readily understood from the accompanying figures and the following description and claims. Although the invention will be described in terms of a specific embodiment, i.e. gravity determinations of a sample liquid in degrees API wherein the reference temperature is 60° F., it is to be understood that this method and apparatus may be employed in making temperature compensated density or gravity determinations of a sample liquid in any desired units.

Figure 1:
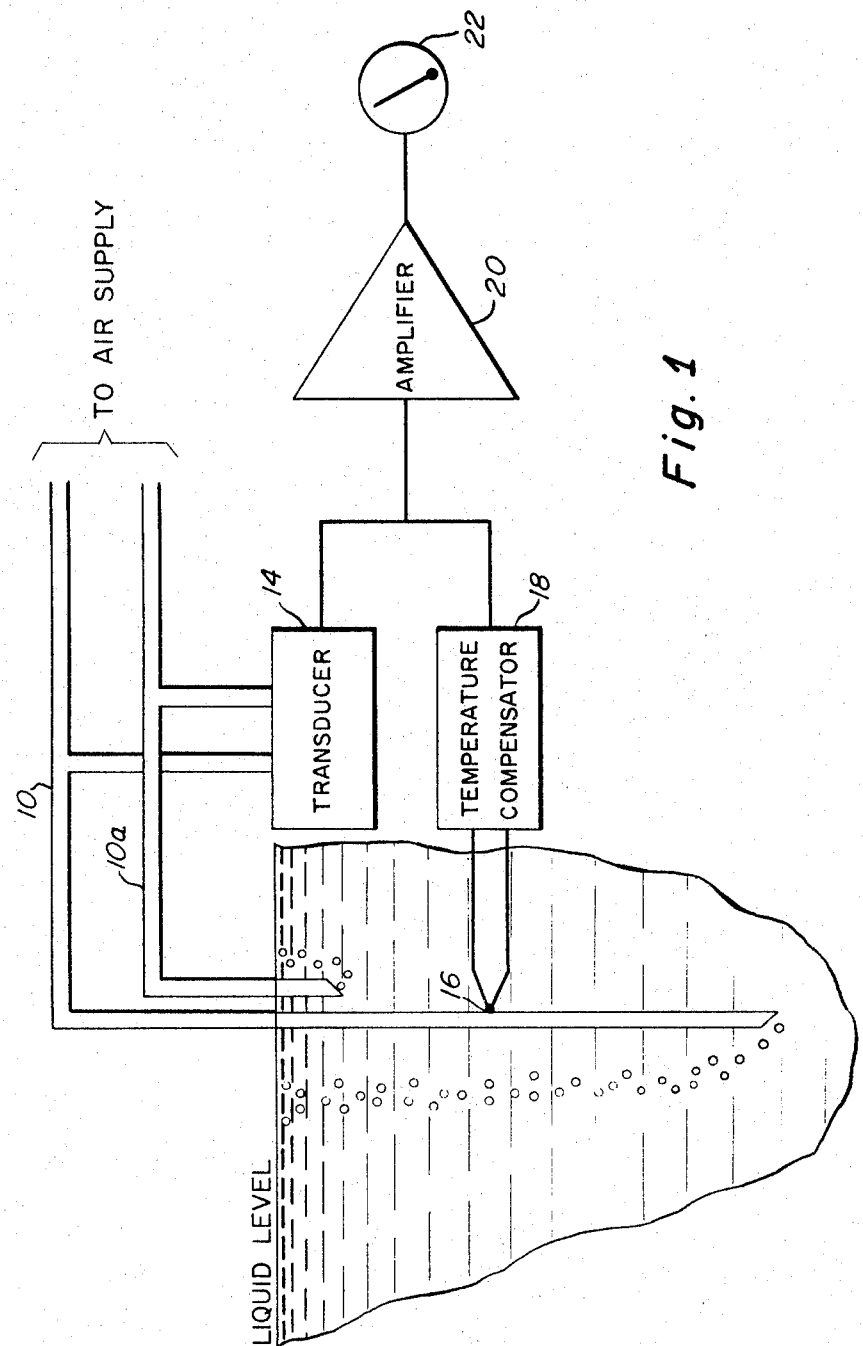
FIGURE 1 is a block diagram illustrating the interconnection of the components of one form of this invention.

FIGURE 1 shows in block diagram form the apparatus in accordance with this invention. Air is bubbled through tubes 10 and 10A at substantially constant rates through the sample liquid. This generates an electrical differential pressure signal proportional to the density of the liquid in transducer 14. Thermocouple 16 positioned within the sample liquid measures the temperature of the liquid which is received by temperature compensator 18. An output signal from transducer 14 and temperature compensator 18 are mixed in a network which compensates the signal from transducer 14 for sample temperature other than 60° F. which is the reference temperature for the API gravity scale. The compensated signal is amplified by D-C amplifier 20 to a level required for driving panel meter 22. Panel meter 22 is graduated in two API ranges 70 to 45° to 25° API, thereby allowing the gravity of the liquid to be directly read.

Figure 2:
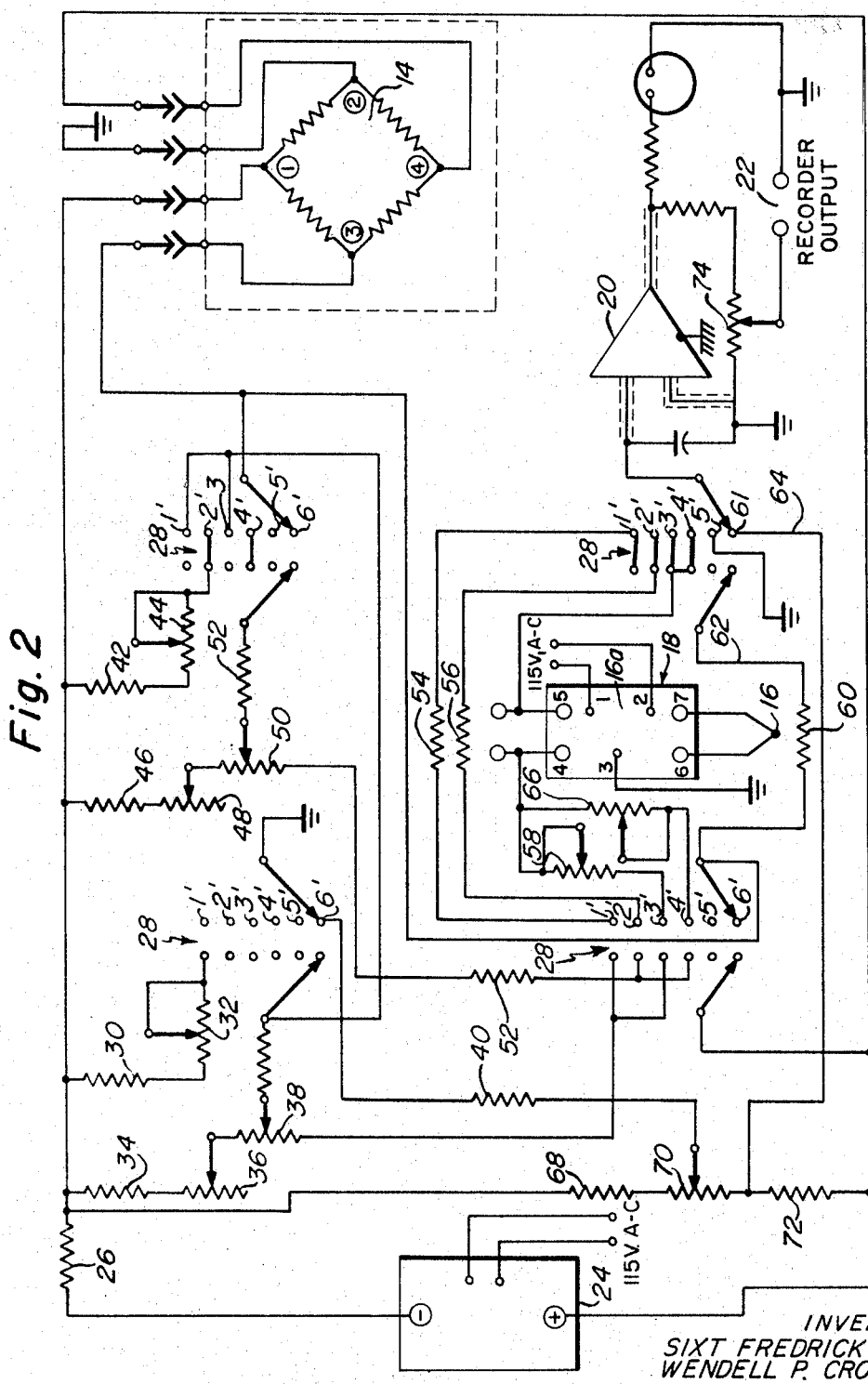
FIGURE 2 is a schematic circuit diagram suitable for illustrating the basic principle of this invention.

Circuitry used to accomplish readout of API gravity 60° F., is shown in detail in FIGURE 2. A twelve volt D-C power supply 24 is used as a source of power for transducer 14. Resistor 26 adjusts transducer input power to 10 volts D-C. The input voltage is applied at terminals 1 and 4 on the transducer 14. Function switch 28, a four-pole, six-position, two-deck switch is used to control operation of the instrument. This switch is shown in position 6'. The instrument functions controlled by each position of switch 28 are:

*Position 1'.—Calibration—70–45° API scale*

In this position, a calibration resistance is switched across an active arm of the transducer bridge. The calibration resistance is the series combination of resistor 30 and variable resistor 32. The slider of 32 is adjusted to provide the correct value of the calibrating resistance. When the proper resistance is switched into the circuit, the output signal from the transducer is equal in magnitude to the signal obtained for a sample of 0.7000 specific gravity or 70.63° API. A reference mark at the left-hand side of meter scale 22 establishes this point. Resistance network 34, 36, 38 and 40 is shunted across the bridge power supply to provide means for compensating the transducer for drift. For example, if the meter pointer fails to coincide with the left-hand scale reference mark, panel control resistance 38 is adjusted until the meter pointer lines up with the reference mark. Resistor 36 is used for coarse adjustment. The instrument is then properly calibrated for the 70–45° range. In position 1', the temperature compensation network is bypassed.

*Position 2'.—Calibration—45–26° API scale*

In position 2', a calibrating resistance made up of the combination resistances 42 and 44 is shunted across an active arm of the transducer bridge for calibration on the 45–26° API scale. As described above, the meter pointer is set to the left-hand reference point on the meter scale. The reference point on this range corresponds to a scale reading of 0.8000 specific gravity or 45.38° API. The resistance network, 46, 48, 50 and 52 is used for drift compensation of transducer 14. Variable resistor 48 provides coarse adjustment and resistance 50, mounted on the control panel, is used for fine adjustment. The temperature compensation network is bypassed in position 2'. Resistors 54 and 56 are switched into the transducer-amplifier circuit in switch positions 1' and 2', respectively, to compensate for bypassing the temperature correction network during each calibration check.

*Position 3'.—Measure—range 70–45° API*

Measurements in the gravity range of 70–45° API are made in position 3' of the selector switch. Drift compensation network 34, 36, 38 and 40 is also switched back into the circuit when the function switch is moved to position 3'. The temperature compensator network 18 consisting of the thermocouple reference power supply 16a and variable resistor 58 is also switched into the measuring circuit. The reference temperature of the compensator is 60° F. The thermocouple reference power supply generates a D-C voltage equal to the output of a measuring thermocouple at some temperature, T, which is referenced to a similar junction at 60° F. Thus, at a sample temperature of 60° F., no output from the temperature compensator is obtained. Polarity of the output signal will be either positive or negative depending on whether sample temperature is above or below the reference temperature of 60° F., respectively. The output signal of the temperature compensator is connected in series with variable resistor 58 and resistor 60. Resistor 58 adjusts current through resistor 60 to the proper level for compensation of the transducer signal for sample temperatures other than 60° F. The net signal is fed to the amplifier through connections on sections 62 and 64 of the function switch 28.

*Position 4'.—Measure—range 45–26° API*

In position 4', gravity measurements in the range of 45–26° API are made with the instrument. The drift correction network consisting of resistors, 46, 48, 50 and 52 is active in this position. The temperature compensator is connected through resistors 66 and 60 for measurements in this range. Temperature compensation is different for the two measuring ranges, thus requiring independent adjustments for proper compensation in each range. Resistors 58 and 66 provide the means for adjustment of the temperature correction to the level required for the two ranges.

Resistors 54 and 56 are switched into the measuring circuit during calibration to simulate the resistance of the temperature compensator network, which is not in the measuring circuit in either of the calibrating positions.

*Position 5'.—Amplifier zero*

In position 5' of the function switch, transducer 14 is disconnected from amplifier 20 and the amplifier input is grounded through a contact on section 64 of the function switch. With zero input, the meter pointer should coincide with the left-hand reference mark on the scale. A deviation indicates that the amplifier had drifted. The D-C offset control of the amplifier should then be adjusted to set amplifier output at zero.

*Position 6'.—Amplifier full-scale check*

In position 6' of the function switch, the transducer and temperature compensator are switched out of the measuring circuit. A small D-C voltage derived from the network 68, 70 and 72 is applied to the amplifier. This voltage is sufficient to drive the meter to the fullscale reference mark. This is a convenient method for checking amplifier gain, because the voltage at the slider of 70 is constant and the source is the regulated power supply for the transducer. Performance of the amplifier can be determined by occasional checks in position 6'.

If necessary, output of the amplifier can be monitored with a potentiometric recorder. Output for the recorder is obtained at jacks 3 and 4. Resistor 74 is an amplitude control for recorder use.

While the apparatus described in the foregoing description is of the type utilizing direct current, apparatus operating on alternating current may also be used. If an alternating current system is employed it is merely necessary to use a carrier amplifier and a discriminator circuit, as would be known by one skilled in the art after reading this disclosure.

Having thus described the invention what is claimed is:

1. An apparatus for automatically providing a temperature-compensated signal corresponding to the density of a sample at a predetermined reference temperature, comprising:

first means in communication with said sample which generate a first electrical signal corresponding to the density of said sample;

second means in communication with said sample which generate a second electrical signal corresponding to the temperature of said sample;

third means coupled to said second means and responsive to said second signal which generate a third electrical signal corresponding to the difference between the temperature of the sample and said reference temperature; and fourth means coupled to said first means and third means which mix said first and third signals to provide said temperature-compensated signal corresponding to the density of the sample at said predetermined reference temperature.

2. The apparatus defined in claim 1 wherein said first means is differential bubbler means provided with differential pressure transducer means for generating said first signal.

3. The apparatus defined in claim 2 wherein said second means is thermocouple junction means adjacent said bubbler means.

4. The apparatus defined in claim 3 wherein said third means is a thermocouple reference power supply means which provides: (1) a no-output signal when the temperature of the sample is the same as the reference temperature; (2) a positive compensating signal when the temperature of the sample is below the reference temperature; and (3) a negative compensating signal when the temperature of the sample is above the reference temperature.

5. An apparatus for measuring the density of a liquid sample, comprising:

means for bubbling gas through said sample at a substantially constant rate from two different levels within said sample to provide a differential pressure signal corresponding to the density of the sample;

transducer means coupled to said bubbling means and responsive to said differential pressure signal for generating a first electrical signal corresponding to the said differential pressure signal;

temperature sensing means in communication with said sample for generating a second electrical signal corresponding to the temperature of the sample;

temperature compensator means coupled to said temperature sensing means and responsive to said second electrical signal for generating a first compensating signal when the temperature of the sample is above a predetermined reference temperature and a second compensating signal when the temperature of the sample is below said reference temperature;

means connected to said temperature compensator means and said transducer means for mixing said compensating signals and said first electrical signal to provide a temperature-compensated density signal;

meter means connected to said mixing means and responsive to said temperature-compensated density signal for providing a visual indication of the density of the sample at said reference temperature; and meter calibrating means coupled with said meter means for calibrating the meter means in accordance with a standard reference liquid at said reference temperature, said calibrating means including switch means operable between a first position for meter calibration and a second position for density measurement.

6. The apparatus defined in claim 5 additionally including amplifier means coupled between said mixing means and said meter for amplifying the temperature-compensated density signal.

7. The apparatus defined in claim 6 wherein said amplifier means are provided with amplifier check means for testing the performance of said amplifier means.

References Cited

UNITED STATES PATENTS 2,577,548   12/1951   Vetter _____ 73—439

OTHER REFERENCES

R. O. Denyes: Continuous Sp. Gravity Measurement, Instrumentation, vol. 4, 1950, pp. 11 and 12.

RICHARD C. QUEISSER, *Primary Examiner.*

JOHN K. LUNSFORD, *Assistant Examiner.*